April 16, 1968 A. MACOVSKI 3,378,633

MONOCHROME PHOTOGRAPHY SYSTEM FOR COLOR TELEVISION

Filed June 24, 1965

INVENTOR
ALBERT MACOVSKI
BY Samuel Lindenberg
ATTORNEY

United States Patent Office 3,378,633
Patented Apr. 16, 1968

3,378,633
MONOCHROME PHOTOGRAPHY SYSTEM FOR COLOR TELEVISION

Albert Macovski, Palo Alto, Calif., assignor to Stanford Research Institute, Menlo Park, Calif., a corporation of California Filed June 24, 1965, Ser. No. 466,624
11 Claims. (Cl. 178—5.4)

ABSTRACT OF THE DISCLOSURE

A filter is provided which has the property that light from a color transparency is projected therethrough, it encodes the different colors of that light, so that a single television camera can produce signals from the encoded light, which are readily separable into signals suitable for applying to a color television receiver, whereby the scene on the transparency may be reproduced in color. The encoding filter has two grids of lines which are of different substractive primary colors and which are angularly superimposed upon one another.

This invention relates to an arrangement for photographing scenes on a monochrome sensitized surface which can thereafter be scanned in a manner to produce electrical signals containing color information of which signals can be reproduced by a color television receiver.

The present system for transmitting color signals for color television using motion picture film as the source of the signals requires that the motion picture film be in color. Since black and white, panchromatic sensitive film is very much cheaper than color film, and since there is a much wider range in film speeds available with monochromatic film than with black and white, panchromatic sensitive, which may hereafter be referred to as color film, it is obvious that it would be cheaper and better if some system were provided to record the information including the color information, of a scene which is photographed on black and white film in such a way that upon the scanning thereof, color television information signals could be derived.

Accordingly, an object of this invention is the provision of a system wherein the color information in a scene is photographed on black and white panchromatic sensitive film in a manner so that this information may be extracted and converted into signals suitable for reproduction by a color television receiver.

Yet another object of the present invention is the provision of a system for reducing the cost of photographic recording for color television.

Still another object of the present invention is the provision of a novel arrangement for using monochromatic sensitized surfaces in a manner such that they can be scanned and can produce signals reproducible by a color television receiver.

These and other objects of the invention are achieved in an arrangement wherein a spatial filter is comprised of two grids of parallel lines, which are angularly superimposed on one another. The lines of these grids may respectively have a different subtractive primary color. For example, one of these grids of lines has the lines colored cyan and the other grid of lines has the lines colored yellow. The filter is positioned within a camera adjacent the film so that the light from the scene or image being photographed passes through the filter on its way to the film. As a result, since the cyan lines do not pass red light, the red information of the scene is encoded in the transparent spaces between the red lines. Since the yellow lines which are diagonal to the cyan lines do not pass blue light, the blue information in a scene is encoded in the transparent spaces between the yellow diagonal lines. The luminance information in the scene is in the average light transmission which is obtained when the film is developed and scanned. These three pieces of information are sufficient to permit a reconstruction of the original color image.

When the film transparency is scanned by a flying spot scanner, for example, the output of the photocell which receives the transmitted light contains a first signal which may have a frequency of five megacycles and which is modulated by the amount of red light. The output also contains a signal at a second lower frequency, such as a three and one-half megacycle signal which is amplitude modulated by the amount of blue light contained. The low frequency information represents the average light, and therefore has the amplitude of the luminance component of the scene. From these three pieces of information, one can construct the Y signal, the B–Y signal, and the R–Y signal which signals are necessary for reproduction of the color image in the presently-employed color television system.

The novel features that are considered characteristic of this invention are set forth with particularity in the appended claims. The invention itself both as to its organization and method of operation, as well as additional objects and advantages thereof, will best be understood from the following description when read in connection with the accompanying drawings, in which:

Figure 3A:
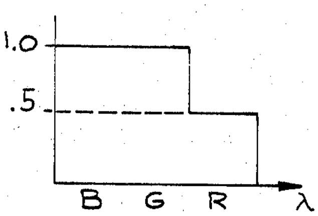
Figure 3B:
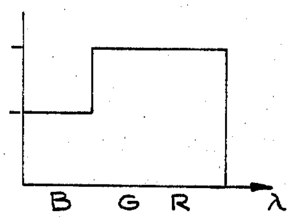
Figure 3C:
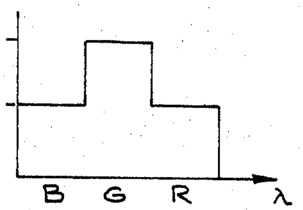
Figure 5:
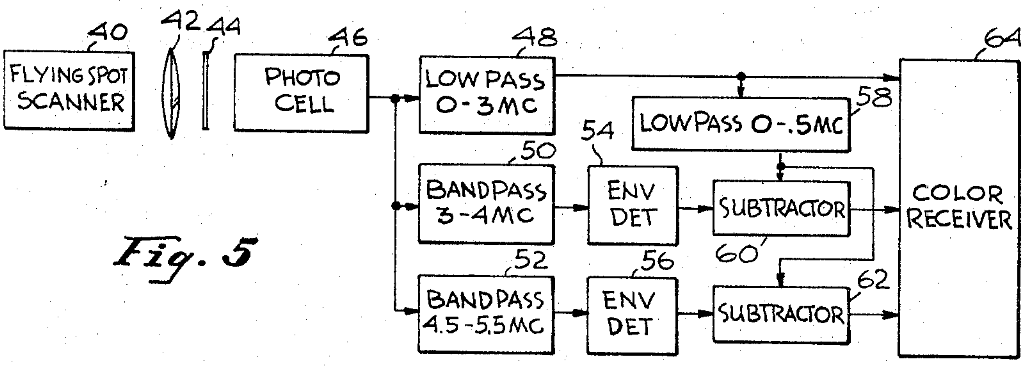
Figure 6:
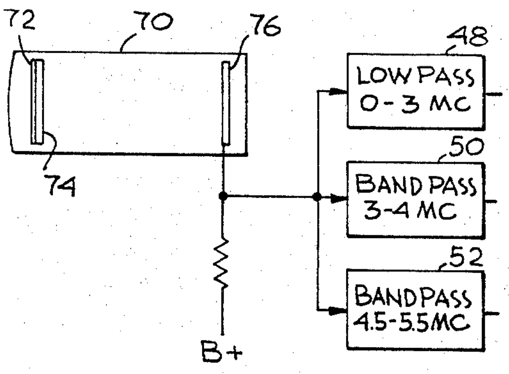
Figure 4:
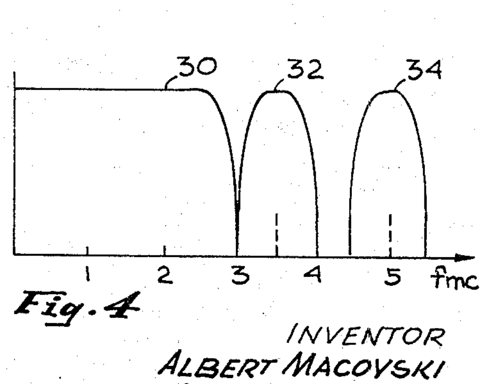

FIGURES 3(*a*), (*b*) and (*c*) respectively represent three waveshapes showing the spectral distribution of the average transmitted light of the respective cyan grid and yellow grid as well as the overall transmission;

FIGURE 4 is a spectrum of the frequency distribution of information provided when a monochrome transparency made with a filter in accordance with this invention is scanned and the transmitted light is converted to electrical signals;

FIGURE 5 is a block schematic diagram of an arrangement of deriving the color information recorded in a transparency which has been produced using the spatial filter in accordance with this invention; and FIGURE 6 is a schematic drawing representing how a monochrome television camera may be modified to provide color signals.

Figure 1:
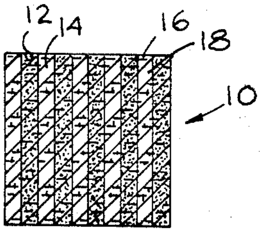
FIGURE 1 shows a spatial filter employed in accordance with this invention for recording color information on black and white, panchromatic sensitive, film.

FIGURE 1 shows a spatial filter 10 which is employed herein for the purpose of recording color scenes on black and white, panchromatic sensitive film in such a way that the original color signals can be separated and applied to a color television display system. As previously indicated, this spatial filter comprises two grids each made of spaced parallel lines, each grid having its lines of a different subtractive primary color, the grids being superimposed on one another and having the respective lines thereof at relative angles such that upon subsequent flying spot scanning of the recorded image made with this filter, an adequate separation is obtained between carrier sidebands derived from said scanning. This will become more clear as this explanation progresses.

In FIGURE 1, the spatial filter 10, by way of example, has a vertical grid composed of alternate cyan lines 12 and transparent lines 14. Superimposed over the entire vertical or cyan grid is another grid with its spaced parallel lines 45° to the cyan grid. This second grid is composed of alternate yellow lines 16 and transparent spaces 18. The line density or number of lines per inch is made the same for the two grids of lines. As may be seen in FIGURE 2, which is a schematic diagram of a movie camera, the spatial filter 10 is placed adjacent the film 20 so that the light from the lens 22 will pass through the filter 10 on the way to the film.

The filter consisting of the two superimopsed grids will not pass red light through its vertical cyan lines and will not pass blue light through its diagonal yellow lines. The resulting monochrome image on the film has all of the red information spatially encoded in the form of vertical lines and all of the blue information spatially encoded in the form of 45° diagonal lines. The average density of the resultant image has experienced two filters, one of which has attenuated half of the red light and the other of which has attenuated half of the blue light. FIGURE 3(*a*) shows the spectral distribution of the cyan filter. It will be seen that blue and green light are substantially unattenuated but that red light has been cut in half. Similarly, in FIGURE 3(*b*) which shows the spectral distribution of the yellow line filter, the blue light has been cut in half but the green and red light has been transmitted unattenuated. From these it may be seen that as is shown in FIGURE 3(*c*), the overall spectral distribution of the total filter is that the green light is substantially unattenuated while the blue and red light is cut in half.

In the idealized representations shown in FIGURES 3(*a*), (*b*) and (*c*), the overall response is shown peaked two to one in the green region. This provides a good approximation to the spectral characteristics of the luminance signal used in color television systems. The red information is encoded in the vertical lines and the blue information is encoded in the diagonal lines. The luminance information is encoded in the average light transmission. These three pieces of information are sufficient to reconstruct the original color image.

Figure 2:
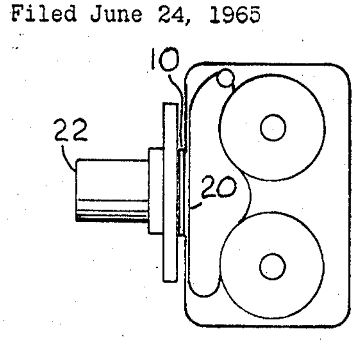
FIGURE 2 is a sectional view of a camera showing a filter in place.

In order to separate the various items of information which are present in the frequency domain, a scanning process is employed. The negative which is obtained employing the techniques shown in FIGURE 2 is developed in the usual manner to produce a positive transparency. By way of illustration, in an embodiment of the invention, approximately two hundred seventy vertical lines were used in the cyan filter and a similar number were used in the diagonal yellow filter. The reason the same approximate number of lines is used is to avoid moire patterns. When the positive transparency is scanned in the conventional manner, at conventional television rates (i.e. 53 microseconds per television line), then a five megacycle signal is produced which is amplitude modulated by the amount of red light present and a three and one-half megacycle signal is produced which is amplitude modulated by the amount of the blue light present. The low frequency information which is derived as a result of the scanning represents the average light and is the amplitude of the luminance component.

FIGURE 4 shows the three wave forms respectively 30, 32, and 34 which respectively represent the luminance spectrum extending up to almost three megacycles, the blue spectrum, which is centered around three and one-half megacycles, and the red spectrum which is centered around five megacycles. The separation between the sidebands of the blue and red spectrum signals is determined by the angles made by the respective grids of the spatial filter 10.

FIGURE 5 is a block schematic diagram which illustrates how the signals necessary to reconstruct the colors of the original scene recorded on the monochrome film, are derived for a television receiver. The flying spot scanner 40 and lens 42 provide the usual light scanning raster on a monochrome transparency 44. The transparency 44 schematically represents the still or motion picture film upon which an image has been recorded using a spatial filter in accordance with this invention. The light which passes through the transparency 44 is modulated thereby and is converted by the photocell apparatus 46 into electrical signals. These electrical signals are applied from the photocell to three filters respectively 48, 50, 52.

The filter 48 is a low pass filter which passes all those frequencies in the output of the photocell in the region between zero and three megacycles. Filter 50 is a three to four megacycle band pass filter. Filter 52 is a four and one-half to five and one-half megacycle band pass filter. The output of the band pass filter 50 is applied to an envelope detector 54, which has as its output an electrical signal representing the blue low frequency signals. The output of the band pass filter 52 is applied to an envelope detector 56, the output of which comprises the red low frequency signals. The output of the low pass filter 48 comprises the Y or luminance signal. It is also applied to a low pass filter 58 which passes signals in the frequency region between zero and .5 megacycle.

The output of the low pass filter 58 is applied to two subtracting circuits 60 and 62. The second input to subtracting circuit 60 comprises the blue low frequency signal whereby the output will be the B—Y signal. The second input to the subtractor 62 comprises the red low frequency signal whereby the output of this circuit comprises the R—Y signal. Accordingly, there is derived from the transparency 44 the three signal components which can be applied to a transmitter for transmission in a color television system, or can be applied directly to a color television receiver 64 which will reproduce in full color the image on the transparency 44.

Overlap in the various spectra is tolerable because of the nature of their frequency distributions. Both the luminance and red signals have spectra which are primarily multiples of the horizontal line frequency. The blue signal, however, which is the source of overlap into each of the other spectra, has primarily components which are odd multiples of one-half of the line frequency because of the diagonal lines. As uch, components which appear in the wrong filter will tend to be invisible because of spatial interlace. That is, they will be of opposite polarity on alternate scanning lines and tend to average out to zero, similar to that of the present color television signals. Although the filtering shown is considered quite adequate, a further refinement to render undesired components invisible would be to move the entire raster one line on alternate frames. This would lose resolution, but would provide interlace in time. Undesired components would be out of phase on alternate frame scans of the same element. The system shown in FIGURE 5 may be employed for showing conventional color film. To do this, the same filter which is normally used in the camera, is placed against the color film to encode it for the scanner. However, as explained previously relatively inexpensive and fast black and white, panchromatic sensitive film can readily be used for color movies that are then displayed in a color television receiver.

In addition to the use of flying spot scanners with an encoded transparency, the spatial filter shown in FIGURE 1 may be used to create a simple color camera from a conventional television camera. Thus, referring to FIGURE 6, there is shown schematically a vidicon camera with a spatial filter 72 which is of the type shown in FIGURE 1 herein. The spatial filter mask is placed adjacent the photocathode 74 of the vidicon tube. The photocathode corresponds to the monochrome sensitized surface of the film. The target 76 has its output connected to three filters 48, 50, 52 which are identical with the ones shown in FIGURE 5. The rest of the circuit is the same as that shown in FIGURE 5. The camera tube shown is independent of registration considerations and provides the required narrow band color signals, thus exploiting the "mixed highs" principle.

There has been accordingly shown and described herein a novel, useful system wherein a spatial filter is employed for photographing on a monochrome recording surface the information which can be subsequently processed for producing a reproduction of the scene or object photographed, in original color.

What is claimed is:

1. A spatial filter for affording a monochrome recording from which upon subsequent scanning, information for reproducing an image in color of the object photographed may be derived, said filter comprising a first grid of parallel spaced lines having the color of a subtractive primary, a second grid relatively angularly superimposed over all of said first grid, said second grid having parallel spaced lines having the color of another subtractive primary, each grid having the same line density.

2. Apparatus as recited in claim 1 wherein the relative angle between said first and second grids is 45°.

3. In a camera of the type wherein light from a scene being photographed is focused by a lens on black and white, monochromatic sensitive film, the improvement for affording a recording of the color information in the scene being photographed on said film in a manner so that said color information may be electronically derived therefrom comprising a filter adjacent said film, said filter having a first grid of vertical spaced lines which are colored cyan, and superimposed over all of said first grid a second grid having its lines at a 45° angle to the lines of the first grid, said second grid lines being yellow in color, both said grids having the same line density.

4. Apparatus as recited in claim 3 wherein the total number of lines in said first and second grids are approximately two hundred seventy.

5. A system for generating electrical signals required for a color television receiver to produce in color an image photographed on a monochrome sensitized surface through a filter comprising a vertical grid of cyan colored lines and a diagonal grid of yellow colored lines superimposed thereon, said system comprising flying spot scanner means for scanning said photographed image at a predetermined frequency, photocell means for generating electrical signals responsive to the light passing through the photographed image from said flying spot scanner means, first low pass filter means for deriving from the output of said photocell means a luminance representative signal, second means for deriving from the output of said photocell means signals representative of the low frequency blue signals, third means coupled to the output of said photocell means for deriving therefrom signals representative of the red low frequency signals, means for subtracting said luminance signals from said blue low frequency signals to provide a blue color difference signal, and means for subtracting said luminance signal from said red low frequency signal to provide a red color difference signal.

6. A system for generating electrical signals required for a color television received to reproduce in color an image photographed on a monochrome transparency through a filter comprising a vertical grid of cyan colored lines and a diagonal grid of yellow colored lines superimposed thereon, said system comprising flying spot scanner means for scanning said monochrome transparency, photocell means for generating electrical signals responsive to the light passing through the transparency from said flying spot scanner means, a first low pass filter for passing signals below three megacycles connected to the output of said photocell means to provide output signals representative of the luminance of the image in said transparency, a second filter connected to the output of said photocell means for passing the frequency component thereof between three and four megacycles, means for detecting the envelope of the output of the signal passed by said second signal filter to produce blue low frequency signals, a third filter connected to the output of said photocell for passing signals between four and one-half and five and one-half megacycles, a second envelope detector for detecting the red low frequency signals in the output of said third filter, a fourth low pass filter connected to the output of said first low pass filter for passing the signal frequency components between zero and .5 megacycle, means for subtracting the output of said fourth filter and said first envelope detector to provide a difference signal representative of a blue color difference signal, and second subtractor means for subtracting the output of said fourth low pass filter from the output of said second envelope detector for providing a difference signal representative of the red color difference signal.

7. In combination with a cmera of the type having a sensitized surface upon which light from a scene being photographed is permitted to fall, a filter for enabling color information to be derived from the recording on said sensitized surface upon the scanning of the image on said sensitized surface, said filter being positioned adjacent said sensitized surface to intercept the light from said scene, said filter having a first grid of spaced and parallel lines colored a first subtractive primary and a second grid superimposed over all of said first grid and having its lines parallel and spaced from one another, and diagonally disposed relative to the lines of said first grid, said second grid lines being colored a second subtractive primary color, both grids having the same line density.

8. A camera as recited in claim 7 wherein said camera is a vidicon camera and said sensitized surface is a photocathode.

9. Apparatus for generating the color representative electrical signals required for a color television receiver to reproduce a scene in color comprising a camera tube having a photocathode exposed to said scene, a target, means for scanning said photocathode for transferring the image on said photocathode as a sequence of electrical signals to said target, and a filter adjacent said photocathode to intercept the light falling thereon from said scene, said filter having a first grid of parallel spaced lines colored a first subtractive primary color, and a second grid of parallel spaced lines colored a second subtractive primary color, said second grid being superimposed on said first grid with its lines diagonally placed relative to said first grid lines, said first and second grids having the same line density, means for deriving said electrical signals from said target, first low pass filter means for deriving from the output of said target a luminance representative signal, second means for deriving from the output of said target signals representative of the low frequency blue signals, third means coupled to the output of said target for deriving therefrom signals representative of the red low frequency signals, means for subtracting said luminance signals from said blue low frequency signals to provide a blue color difference signals, and means for subtracting said luminance signals from said red low frequency signal to provide a red color difference signal.

10. Apparatus as recited in claim 9 wherein said first grid lines are cyan color and said second grid lines are yellow in color and make an angle of substantially 45° with said first grid lines.

11. Apparatus for generating the color representative electrical signals required for a color television receiver to reproduce a scene in color comprising a camera tube having a photocathode exposed to said scene, a target, means for scanning said photocathode for transferring the image on said photocathode as a sequence of electrical signals to said target, and a filter adjacent said photocathode to intercept the light falling thereon from said scene, said filter having a first grid of parallel spaced lines colored a first subtractive primary color, and a second grid of parallel spaced lines colored asecond subtractive primary color, said second grid being superimposed on said first grid with its lines diagonally placed relative to said first grid lines, said first and second grids having the same line density, means for deriving said electrical signals from said target, a first low pass filter for passing signals below three megacycles connected to the output of said target to provide output signals representative of the luminance of the image in said transparency, a second filter connected to the output of said target for passing the frequency component thereof between three and four megacycles, means for detecting the envelope of the output of the signal passed by said second signal filter to produce blue low frequency signals, a third filter connected to the output of said target for passing signals between four and one-half and five and one-half megacycles, a second envelope detector for detecting the red low frequency signals in the output of said third filter, a fourth low pass filter connected to the output of said first low pass filter for passing the signal frequency components between zero and .5 megacycles, means for subtracting the output of said fourth filter and said first envelope detector to provide a difference signal representative of a blue color difference signal, and second subtractor means for subtracting the output of said fourth low pass filter from the output of said second envelope detector for providing a difference signal representative of the red color difference signal.

References Cited

UNITED STATES PATENTS

| | | | |
|---|---|---|---|
| 2,733,291 | 1/1956 | Kell | 178—5.4 |
| 2,769,028 | 10/1956 | Webb | 178—5.4 |
| 2,892,883 | 6/1959 | Jesty et al. | 178—5.4 |
| 2,907,817 | 10/1959 | Teer | 178—5.4 |
| 3,300,580 | 1/1967 | Takagi et al. | 178—5.4 |

ROBERT L. GRIFFIN, *Primary Examiner.*

JOHN W. CALDWELL, *Examiner.*

J. A. O'BRIEN, R. MURRAY, *Assistant Examiners.*